Aug. 13, 1968    K. MUNK    3,396,532
COMBUSTION AIR SYSTEM
Filed June 6, 1966
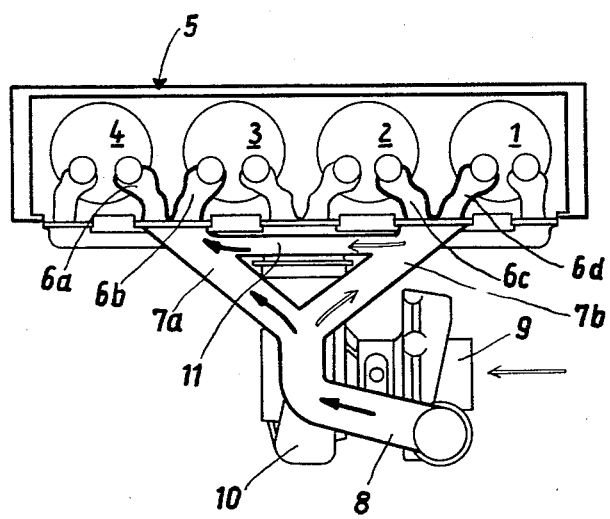
Inventor:
KURT MUNK
By:
M Fleur and Toren
ATTORNEYS

United States Patent Office 3,396,532
Patented Aug. 13, 1968

3,396,532
COMBUSTION AIR SYSTEM
Kurt Munk, Stuttgart-Unterturkheim, Germany, assignor to Geratebau Eberspacher OHG, Esslingen (Neckar), Germany
Filed June 6, 1966, Ser. No. 555,350
Claims priority, application Germany, June 4, 1965, G 43,795
6 Claims. (Cl. 60—13)

ABSTRACT OF THE DISCLOSURE

A combustion air system for a four stroke cycle internal combustion engine includes a combustion air compressor having a high pressure discharge arranged centrally between four in-line cylinders. The central high pressure air discharge is connected through two divergent feed lines which are connected at their outer ends to short inlet passages connecting the inlet ports of the outer two cylinders on each side. A feature of the construction is the use of a short circuit line connected in the shortest straight path between the two feed lines. This short circuit line insures that each of the divergent feed lines will provide a fluid under pressure to whichever of the inlet ports is open and there will not be any sudden decrease of pressure in one of the lines which will cause an unbalance in the combustion system.

---

This invention relates in general to combustion air supply systems for internal combustion engines and in particular to a new and useful exhaust gas turbocharger arrangement for precompressing the combustion air particularly for four-stroke cycle engines which includes means in the charging line between the engine and the air compressor to prevent pumping.

The theoretically attainable efficiency in the charging of a four-stroke cycle internal combustion engine is reduced quite considerably by the so called pumping of the charging unit. Although this is not yet quite understood, vibrations of the air column in the charging air system may be responsible. These vibrations also cause a return flow and hence a reduction of the air mixture in the cylinder. The pumping in the compressor is brought about by the primary return flow in the charging lines and it propagates through the wheel of the turbo charger which may also cause a reversal of flow in the compressor.

An object of the invention therefore is to suppress pumping and return flow, particularly in four-stroke cycle internal combustion engines which are charged with air under pressure by a turbocharger such as an exhaust gas turbocharger. The means which have been attempted as a solution for this problem up till now have been possible only with too great an expense. What has been proposed is an air chamber arrangement, the air chamber having a volume that for reasons of space would not be acceptable in internal combustion engines of vehicles. In order to avoid pumping, there has also been suggested an arrangement of compressors having inlet diameters smaller than necessary for operation and service. In such an arrangement, the working range of the motor in the compressor characteristic field was moved further away from the pump limit. This, however, always involves reduction of compressor efficiency and particularly in the case of engines of smaller stroke volume (piston displacement).

In accordance with the present invention it is possible to prevent pumping in a simple manner by arranging charging lines between the engine and compressor which are interconnected by a short circuit line adjacent the intakes of the engine cylinders. It has been found particularly desirable to provide the short circuit connection as close as possible to the inlets of the combustion engine.

Accordingly it is an object of the invention to provide a combustion air compressor supply system for an internal combustion engine which includes at least two separate lines feeding the combustion air to selected cylinders and with a short circuit line interconnected between the feeding lines as close to the cylinder inlets as possible.

A further object of the invention is to provide a combustion engine combustion air supply system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawings is a somewhat schematic partial elevational and partial sectional view of an internal combustion engine having an exhaust gas turbine compressor arrangement constructed in accordance with the invention.

Referring to the drawing in particular, the invention embodied therein comprises a combustion air supply system for an internal combustion engine generally designated 5. In the embodiment illustrated, the internal combustion engine 5 has four separate cylinders designated 1, 2, 3 and 4. Each cylinder 1 to 4 has associated therewith a short inlet charging line designated 6a, 6b, 6c and 6d.

In accordance with the invention, the charging lines of adjacent cylinders, for example cylinders 1 and 2 and cylinders 3 and 4, are respectively connected to connecting lines or charging lines 7b and 7a. The charging lines 7a and 7b are connected at their other ends to a combined line or charging air line 8 which leads directly out of a turbo compressor 9. The tubo compressor 9 is driven from an exhaust gas turbine 10 which is connected to the engine 5 to receive the exhaust gases therefrom.

In accordance with the feature of the invention, the connecting lines 7a and 7b are short circuited by the short circuit line 11.

In the arrangement shown, the ignition sequence of the cylinders is, for example, 1, 3, 4, 2. With the layout as indicated, the operation of the device is as follows:

Let it be assumed that the cylinder valves 2 are closed during a relatively long interval of time, while the cylinders 3 and 4 open successively. To utilize fully the air mixture supplied by the compressor 9, the partial stream intended for the cylinders 1 and 2 and connected through the connecting line 7b is sucked off due to the ejector effect through the short circuit line 11 into the charging line 7a and additionally introduced into the cylinders 3 and 4. This prevents any air column from vibrating in the collecting line 7b or from producing reactions which have the effect of pumping in the compressor 9.

While a specific embodiment of the invention has been shown and described in detail to illustrate the application of the inventive principles, it will be understood that the invention may be embodied otherwise without departing from such principles.

What is claimed is:
1. A combustion air system for an internal combustion engine, particularly for a four-stroke cycle internal combustion engine, comprising an internal combustion engine having a plurality of cylinders arranged in a row and each with a separate combustion air inlet, a combustion air compressor having a high pressure air discharge substantially centrally arranged in respect to said cylinders, at least two feed lines connected at their one ends to said high pressure air discharge diverging outwardly from the central high pressure air discharge toward respective opposite ends of said row of cylinders and separately respectively connected at their opposite ends to at least one combustion air inlet of at least one engine cylinder, and a short circuit line connected in the shortest straight path between said two feed lines adjacent said combustion air inlet of said internal combustion engine cylinders and providing a communication between said two feed lines adjacent the ends connected to said inlet to permit flow from either of said feed lines into the other when the inlet adjacent the line receiving the flow is directing air into the associated cylinder.

2. A combustion air system for a four-stroke internal combustion engine, comprising an internal combustion engine having four in-line cylinders arranged closely adjacent the end cylinder of each end and the next adjacent cylinder having inlet ports arranged on adjacent sides, a combustion air compressor having a high pressure discharge centrally arranged between said four cylinders, at least two divergent feed lines connected at their one ends to said high pressure air discharge diverging outwardly from the central high pressure air discharge toward the respective inlet ports of the outer and the next adjacent inner cylinders on each end respectively, one of said divergent lines being connected to two inlets of the corresponding outer cylinder on each end and the next adjacent inner cylinder, and a short connecting line extended in the shortest straight path between said adjacent feed lines at a location adjacent the outer ends of said divergent feed lines which are connected to said inlet ports whereby to permit flow from either of said feed lines into the other when the inlet port connected to the respective divergent feed line is receiving combustion air.

3. A combustion air system according to claim 1, wherein said air compressor includes an exhaust turbine driven from the exhaust gases of said engine.

4. A combustion air system according to claim 1, wherein said internal combustion engine includes at least four cylinders, said feed lines including a first feed line connected to the inlets of two adjacent cylinders, a second feed line connected to the inlets of another two adjacent cylinders.

5. A combustion air system according to claim 1, wherein said internal combustion engine includes four in-line cylinders, said two feed lines including a first feed line and a second feed line, said first two of said four cylinders each including an inlet extending in a direction toward each other and connecting said first feed line, said third and fourth cylinders each having an inlet extending in a direction toward each other and connecting said second feed line, said first and second feed lines connecting to said compressor via a central feed supply line centrally arranged in respect to said cylinders.

6. A combustion air system according to claim 4, wherein said feed lines extend outwardly from said centrally arranged feed charging line in opposite directions to said first and second cylinder and said third and fourth cylinder respectively.

References Cited

UNITED STATES PATENTS

| 1,982,625 | 12/1934 | Barker | 123—52 |
| 2,348,518 | 5/1944 | Birkigt | 60—13 |

FOREIGN PATENTS

| 1,021,285 | 11/1952 | France. |
| 1,026,238 | 2/1953 | France. |

MARTIN P. SCHWADRON, *Primary Examiner.*

D. HART, *Assistant Examiner.*